May 13, 1947.  F. E. DEANS  2,420,524
CLUTCH MECHANISM OF KNITTING MACHINES
Filed Jan. 22, 1946  2 Sheets-Sheet 1

INVENTOR
Frederick Edward Deans
BY
ATTORNEY

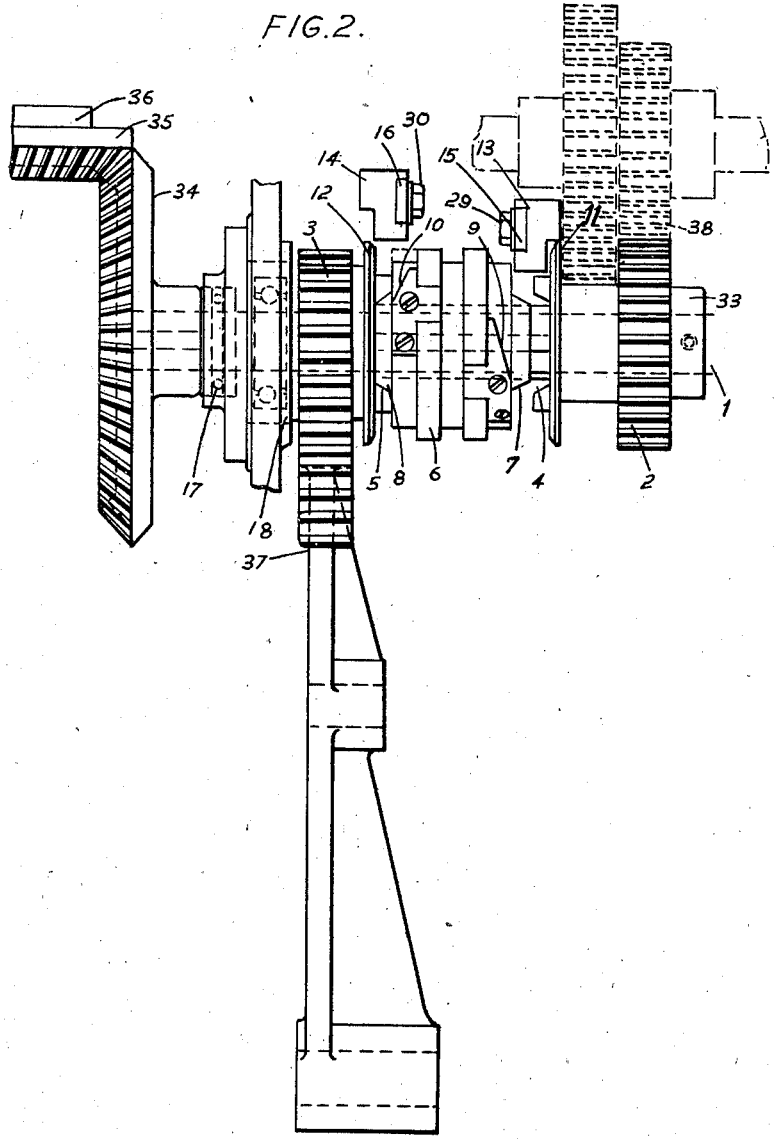

Patented May 13, 1947

2,420,524

UNITED STATES PATENT OFFICE 2,420,524

CLUTCH MECHANISM OF KNITTING MACHINES

Frederick Edward Deans, Leicester, England, assignor to The Bentley Engineering Company Limited, Leicester, England Application January 22, 1946, Serial No. 642,613
In Great Britain January 31, 1945

8 Claims. (Cl. 66—56)

In the driving mechanism of circular knitting machines of the type commonly referred to as seamless hose and half-hose machines, it is the invariable practice to provide a dog clutch for changing over between rotary and oscillatory knitting. This clutch consists of a sleeve slidably keyed to a shaft and having a dog at each end; it is movable endwise between two alternative positions in one of which the dog at one end engages a recess in a continuously rotating gear and in the other of which the dog at the other end engages a recess in a gear (known as the quadrant pinion) which revolves to and fro. In this manner, one or other of the gears is coupled to the shaft to drive it. The sleeve is shifted at the required times by means of a clutch lever of the first order rocked by cams on a drum secured to the control shaft of the machine.

This clutch mechanism has certain disadvantages. The shift has to be extremely rapid, and since the drum is only stepped round slowly a steep cam-contour is rendered necessary and considerable strain is thrown on the working parts, their bearings, and the frame of the machine. Moreover since the dogs and their recesses are slightly tapered for easy engagement there is an intermediate stage in the gear change whereat neither dog is engaged and the drive is interrupted, after which the drive is taken up as one dog engages with the result that a certain degree of shock is unavoidable, and this is aggravated by the fact that the change to rotation is made while the constantly-rotating gear is overtaking the quadrant pinion, so that immediately upon engagement the rotating parts of the machine have to be accelerated. A further disadvantage is in restrictions imposed on the timing of other operations of the machine. It will be understood that the change has to be made in the very small interval of time during which the two recesses are substantially aligned and travelling in the same direction, it has to be coincident with a racking movement of the drum, and it has to be made four times in the production of each sock or the like; in practice these requirements impose limitations on the timing of other operations that are also controlled by the drum or by another like member rotating with it. A specific object of the present invention is a construction of clutch mechanism for seamless hose and half hose machines whereby these disadvantages are obviated or minimised, but the invention is not restricted in its application to such machines and is of utility in knitting machines in general.

The invention provides, in a knitting machine, clutch mechanism comprising two members, viz. a rotary thrust cam and a thrust member, one of which is movable axially, a rotary clutch member connected to the axially-movable member for axial movement thereby, and a thrust-transmitter displaceable into and out of operative position in which it is interposed in the path of the cam to transmit thrust between the latter and the thrust member and thereby to produce the aforesaid axial movement. Therefore in operating the clutch this thrust-transmitter is not subjected to the loads that in the known clutch mechanism are imposed on the clutch lever and its bearings, the control mechanism that displaces the thrust-transmitter is not required to provide the power for shifting the clutch member, and a considerable latitude in the timing of the displacement of the thrust-transmitter is permissible because the clutch movement only occurs when the rotation of the cam brings it into contact with said transmitter and not when the transmitter is moved into operative position. Preferably, it is the cam which is connected to the clutch member although the invention includes a construction in which the thrust member is connected to the clutch member, being constituted for example by an end face on the clutch member.

In order to move the clutch member in either direction, there may be two opposed thrust members, two oppositely-acting cams, and two thrust-transmitters, one for each cam, movable alternatively into operative position. In such an arrangement the clutch member may be double acting, i. e., each of its two positions being a clutching position as in the case of a clutch for changing over from rotary to oscillatory knitting.

According to an important subsidiary feature of the invention, the thrust-transmitter (or each of them) is further displaceable into a locking position in which it is interposed between the clutch member and the thrust member and thereby prevents reverse movement of the former.

The foregoing and other features of the invention set out in the appended claims are incorporated in the construction which will now be described (as an example of the application of the invention to the dog clutch of a seamless hose or half hose machine for changing over between rotation and oscillation), with reference to the accompanying drawings in which—

Figure 2 is a front elevation of the clutch; while

Figure 1:
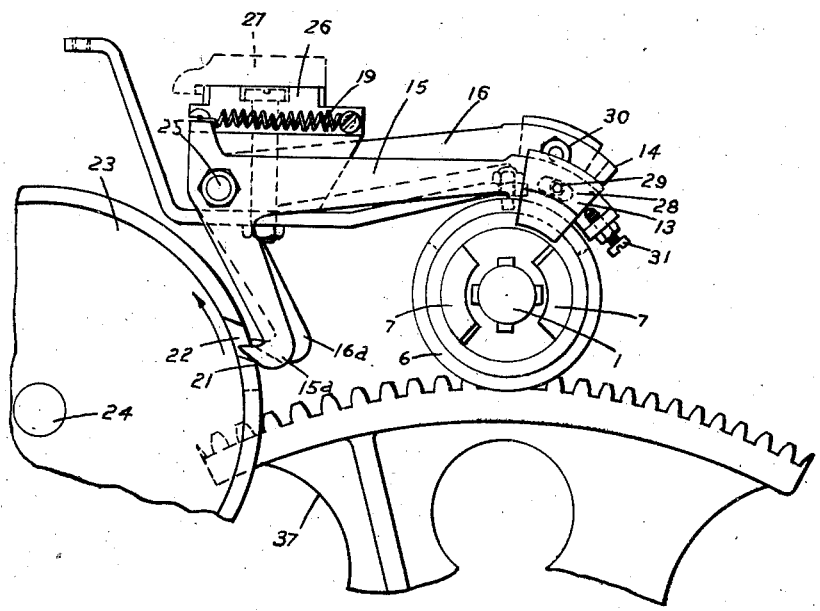
Figure 1 is a side elevation of the relevant parts of the mechanism (with the gear 2, hereinafter referred to, omitted for the sake of clarity)

This example follows the usual construction in that freely mounted on the drive shaft 1 of the machine there is the continuously rotating gear 2 and the quadrant pinion 3 each having a tapered recess 4 and 5 respectively (or each having a pair of such recesses), and slidably keyed or splined to the shaft 1 between them there is a clutch member 6 having at each end at least one tapered dog 7 or 8 so that by shifting the clutch member 6 axially either the gear 2 or the pinion 3 may be coupled to the shaft 1 to drive it.

According to this embodiment of the present invention the clutch member 6 carries two thrust cams 9 and 10, one directed towards each end thereof, and the gear 2 and pinion 3 are each provided with a thrust member, i. e., a flange 11 or 12 forming a thrust face. A metal block 13 or 14, constituting a thrust transmitter, is mounted on the free end of an arm of each of two bell-crank levers 15, 16, there being a thrust-transmitter for each cam. When a lever 15 or 16 is rocked to place its block 13 or 14 in the path of one of the cams 9 or 10, the rotation of the clutch member 6 eventually carries said cam against said block 13 or 14 so that the latter presses against the adjacent flange 11 or 12 (with which it is then in face contact) and since the flange and the gear 2 or pinion 3 to which it is attached are prevented from moving axially by suitable thrust bearings indicated at 17 and 18, the wedging action of the cam results in the clutch member moving axially along the shaft to make the required change. When the change in the reverse direction is required, the block just mentioned is retracted and the other one is moved into operative position to cooperate with the other cam.

The movement of the clutch member 6 away from either flange 11 or 12 produces sufficient space, between an end face of the clutch member and the flange, for the block to move into it thereby locking the clutch member against accidental return.

Figure 3:
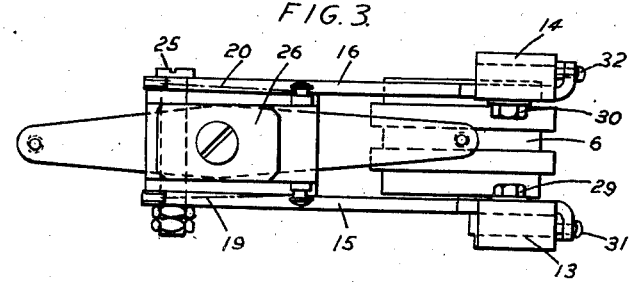
Figure 3 is a plan, mainly of the control mechanism.

The two levers 15, 16 are biased by springs 19, 20 (whereof only the centre lines are shown in Fig. 3) to carry their blocks to the operative position and thence into the locking position and are controlled by patterning or timing mechanism here shown as consisting of cams 21, 22 on a drum 23 on the control shaft 24 of the machine which act on an arm (15a or 16a) of each lever and always hold one or other blocks inoperative, the arrangement being such that when either block is permitted to move to its operative position the other block is withdrawn.

The levers 15, 16 are pivoted on a pin 25 in a block 26 which is mounted on the machine frame, a portion of which is indicated at 27. A certain degree of adjustment in timing is provided for mounting the blocks 13, 14 adjustably on their respective levers 15, 16. For this purpose the free end of each lever has a slot (such as that indicated at 28 in Fig. 1) through which a set screw 29 or 30 extends into the associated block, and the block bears against an adjusting screw 31 or 32 in the lever.

It will therefore be appreciated that each thrust-transmitting block may be adjusted in a direction substantially circumferentially of the thrust cam so that the phase in the rotation of said cam whereat it acts on the thrust-transmitter and shifts the clutch member may be adjusted.

The thrust reaction may be taken by any suitable system of bearings. In the illustrated construction the reaction from thrust flange 11 is transmitted to a thrust collar 33 fixed on shaft 1 and by the latter to the thrust bearing 17 mounted in the machine frame 27 (Fig. 2). The reaction from the other thrust flange 12 is transmitted directly to thrust bearing faces 18 on the quadrant gear 3 and thence to the machine frame. The thrust loads occur only when the clutch member 6 is being moved and consequently are only of short duration.

It is to be appreciated that the foregoing mechanism is installed in the conventional manner in a seamless hose or half hose machine, the shaft 1 being geared by gears 34, 35 to the rotatable member 36 (which is to be considered as illustrating a portion of the rotatable cylinder or cam box) and the quadrant being indicated at 37 and the gearing driving the gear 2 in dotted lines at 38 in Fig. 2, so that illustration or description of the remainder of the machine is unnecessary to one skilled in the art to which this invention relates.

I claim:

1. In a knitting machine, a clutch mechanism comprising two members, a rotary thrust cam and a thrust member, one of which is movable axially, a rotary clutch member connected to the axially movable member for axial movement thereby, and a thrust-transmitter displaceable into and out of operative position in which it is interposed in the path of the cam to transmit thrust between the latter and the thrust member and thereby to produce the aforesaid axial movement.

2. Mechanism according to claim 1, having the cam connected to the clutch member.

3. Mechanism according to claim 1, having, for moving the clutch member in either direction, two opposed thrust members, two oppositely-acting cams, and two thrust-transmitters, one for each cam, movable alternatively into operative position.

4. Mechanism according to claim 1, having the thrust-transmitter further displaceable into a locking position in which it is interposed between the clutch member and the thrust member and thereby prevents reverse movement of the former.

5. In a circular knitting machine, being a seamless hose or half hose machine, clutch mechanism for changing over between rotary and oscillatory knitting motion of the type comprising a drive shaft, a continuously rotating gear and an oscillatable quadrant gear thereon, and a clutch member movable along said shaft between the two gears to clutch them selectively to the shaft, having in combination a pair of oppositely-disposed thrust cams on the clutch member, and a pair of thrust-transmitters, one for each cam, movable selectively into the paths of their respective cams and for producing, by contact therewith, movement of the clutch member to clutch one or other gear to the shaft.

6. In a knitting machine, a clutch mechanism comprising a rotary clutch member movable axially between two alternative clutching positions and two mechanisms for moving it one in each direction each of which mechanisms comprises two members, a rotary thrust cam and a thrust member whereof one is movable axially and is connected to the clutch member, and a thrust-transmitter displaceable into and out of operative position in which it is interposed in the path of the associated thrust cam to transmit thrust between the latter and the associated thrust member and thereby to produce axial movement of the clutch member.

7. In a knitting machine, being a seamless hose or half hose machine capable of knitting by rotating and by oscillation and having a driving shaft carrying a continuously rotating gear and an oscillating gear; clutch mechanism for clutching said gears alternatively to the shaft which mechanism comprises a clutch member keyed to the shaft and slidable axially along it between alternative positions in one of which it clutches the rotating gear to the shaft and in the other of which it clutches the oscillating gear to the shaft, and two mechanisms for moving it one in each direction each of which mechanisms comprises two members, a rotary thrust cam and a thrust member whereof one is movable axially and is connected to the clutch member, and a thrust-transmitter displaceable into and out of operative position in which it is interposed in the path of the associated thrust cam to transmit thrust between the latter and the associated thrust member and thereby to produce axial movement of the clutch member.

8. In a knitting machine, a clutch mechanism comprising two members, a rotary thrust cam and a thrust member, one of which is movable axially, a rotary clutch member connected to the axially movable member for axial movement thereby, a thrust-transmitter displaceable into and out of operative position in which it is interposed in the path of the cam to transmit thrust between the latter and the thrust member and thereby to produce the aforesaid axial movement and means for adjusting said thrust-transmitter substantially circumferentially of the thrust cam.

FREDERICK EDWARD DEANS.

REFERENCES CITED

The following references are of record in the file of this patent:

UNITED STATES PATENTS

| Number | Name | Date |
|---|---|---|
| 385,322 | Rightmire | June 26, 1888 |
| 465,842 | Dow | Dec. 29, 1891 |

FOREIGN PATENTS

| Number | Country | Date |
|---|---|---|
| 127,495 | Switzerland | Sept. 1, 1928 |